United States Patent [19]

Harter et al.

[11] 4,049,707
[45] Sept. 20, 1977

[54] APPARATUS FOR FLUID TREATMENT BY CORONA DISCHARGE

[75] Inventors: Joseph William Harter, Los Angeles; Stuart Wallace Beitzel, Santa Monica, both of Calif.

[73] Assignee: O-3 Company, Los Angeles, Calif.

[21] Appl. No.: 659,929

[22] Filed: Feb. 20, 1976

[51] Int. Cl.$^2$ .............................................. C01B 13/11
[52] U.S. Cl. ................................... 250/531; 250/532
[58] Field of Search ................................. 250/531–541; 204/176

[56] References Cited

U.S. PATENT DOCUMENTS

| 2,128,455 | 8/1938 | Darling | 250/532 |
|---|---|---|---|
| 2,403,241 | 7/1946 | Schaefer | 250/532 |
| 3,801,791 | 4/1974 | Schaefer | 250/532 |
| 3,836,786 | 9/1974 | Lowther | 250/540 |

*Primary Examiner*—Mack John H.
*Assistant Examiner*—Aaron Weisstuch
*Attorney, Agent, or Firm*—Edward D. O'Brian

[57] ABSTRACT

An effective, efficient apparatus for treating a fluid by electron emission or corona discharge having a prolonged useful life can be constructed so as to include a first electrode, a composite dielectric structure located along the side of and spaced from the first electrode so as to define a gap between the first electrode and the dielectric structure and a second electrode. In such a structure preferably the gap is closed off by a flexible seal permitting the thickness of the gap to be adjusted; preferably this thickness is related to the operating parameters of the equipment used to power the apparatus and to the characteristics of the product or products produced in the apparatus. Preferably the dielectric structure consists of at least one layer of a first dielectric material including overlapping flat plate-like particles of an inert dielectric material located directly against the second electrode. The dielectric structure should be free from any voids and there should be no voids of any type between it and the second electrode. Preferably the surfaces of the first electrode and of the dielectric structure exposed to the gap are coated with an inherent coating of a material which either catalyzes the formation of a desired reaction product within said apparatus or acts as a reverse catalyst to minimize the decomposition of such a product. A preferred apparatus embodying the invention is intended to be utilized in the production of ozone.

20 Claims, 1 Drawing Figure

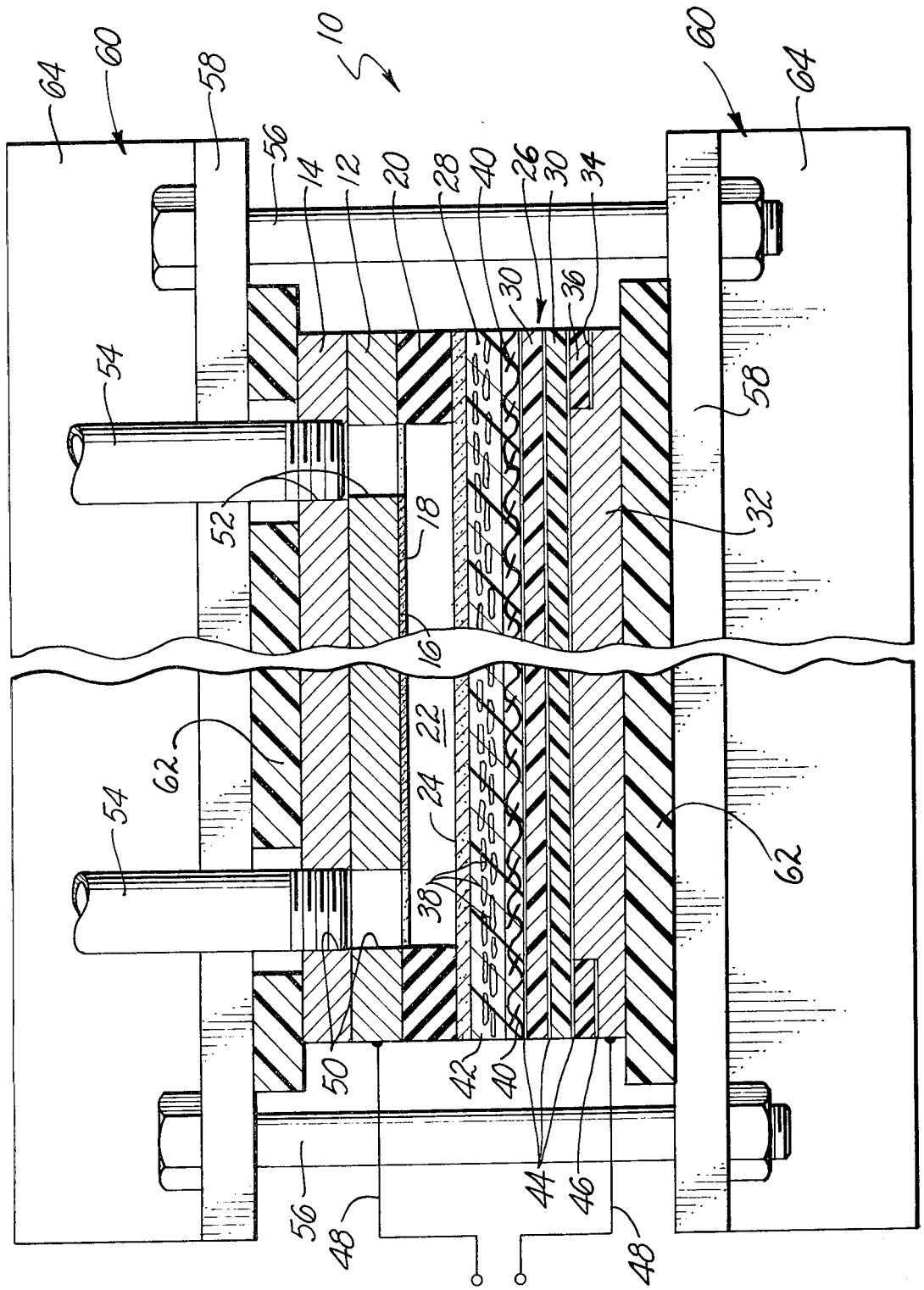

4,049,707

APPARATUS FOR FLUID TREATMENT BY CORONA DISCHARGE

CROSS REFERENCE TO RELATED APPLICATION

The subject matter set forth in this specification is related to the subject matter set forth in the co-pending U.S. Pat. application Ser. No. 652,633 filed Jan. 26, 1976 in the names of the inventors in this application entitled "Fluid Treatment by Electron Emission" in the sense that an apparatus as disclosed in this specification is considered preferable for use in fluid treatment by electron emission as set forth in the noted co-pending application. an apparatus coming within the scope of the subject matter of this specification is, however, capable of being otherwise used in treating a fluid by electron emission. Because of this relationship between the noted application and this specification the entire disclosure of this co-pending application is incorporated herein by reference.

BACKGROUND OF THE INVENTION

The invention set forth in this specification pertains to new and improved apparatus for fluid treatment by electron emission or corona discharge. Although the invention is intended to be beneficial in connection with the treatment of any fluid susceptible to treatment by electron emission at this time it is primarily intended to be utilized in connection with the production of ozone from either pure oxygen or an oxygen containing gas mixture. The complete invention set forth is considered to embody a number of facets which can be separately utilized in an apparatus for the purpose indicated but which are of such a character that they are preferably utilized in conjunction with one another.

It is, of course, conventional to construct an apparatus for use in treating a fluid by electron emission which includes a first electrode, a dielectric located alongside of and spaced from the first electrode so as to define a gap between the first electrode and the dielectric, a second electrode adjacent to the dielectric and an appropriate inlet and outlet leading to the gap so that a fluid may be circulated through the gap. In the operation of such a device an appropriate current is applied to the electrodes so as to cause periodically reversing electron flow or emission in the gap as the fluid being treated is circulated through the gap. Although an apparatus of this type can be utilized in treating many different types of fluid it is believed that this type of apparatus is primarily utilized at the present time in connection with the treatment of either pure oxygen or an oxygen containing gas mixture so as to form ozone.

An apparatus consisting only of the parts delineated in the preceding paragraph is frequently referred to as a "cell". It is conventional to use a plurality of such cells either in parallel with one another or in series with one another. Further the sizes of such cells may be varied within comparatively wide limits. It is considered that such cells are most commonly constructed so that the various parts enumerated in the preceding are flat and disposed parallel to one another. It is, however, known to manufacture such cells of a cylindrical configuration so that various parts of them are concentric to one another.

In the use of any cell in connection with the treatment of a fluid by electron emission certain reasonably obvious factors are considered to be of paramount importance. One of these is efficiency and more specifically efficiency in terms of the amount of a desired product formed as a result of the treatment within the cell per unit of power consumed. Thus, for example, the efficiency of an apparatus or cell for producing ozone is meansured in the amount of ozone produced per unit of power used in the production of ozone. This matter of cell efficiency is quite complex and is obviously related to the way a specific electron emission cell is utilized. The efficiency of a cell will vary in accordance with the manner in which power is supplied to the cell and other factors which are considered relatively unimportant to an understanding of the invention.

Another factor which is quite important in connection with any apparatus or cell for use in fluid treatment be electron emission concerns how long the cell will operate without breaking down as it is used. From a practical standpoint it is undesirable to utilize an electrically efficient cell or apparatus if such cell or apparatus has to be frequently taken apart and repaired so that it will operate satisfactorily. This matter of the useful life of an apparatus or cell as indicated is relatively involved because the conditions within an apparatus or cell of the type under consideration are normally such as to promote comparatively raid failure of the dielectric within the cell.

This can be easily illustrated with reference to an apparatus or cell for producing ozone. Ozone is a highly reactive gas which is well know to be detrimental to normal organic compounds and materials. The conditions set up within an apparatus or cell as noted as the result of the use of relatively intense, constantly reversing electron flow tend to promote deterioration in normal or conventionally used dielectrics. When such a dielectric is affected so that a flaw and/or discontinuity penetrates it an apparatus as noted is no longer satisfactory for its intended purpose.

It is considered that to a degree the undesirability of prior cells for use in fluid treatment by electron emission is suggested or indicated by the lack of significant widespread utilization of fluid emission in the production of ozone, particularly since it is well recognized that ozone possesses many advantages for many oxidizing purposes, such as for example, in purifying drinking water, treating sewage effluent and the like. Regardless of whether or not this is the case it is considered that there is a need for new and improved apparatus for use as a reaction unit or cell in the treatment of fluid by electron emission. More specifically it is considered that there is a need for cells which can be efficiently utilized over prolonged periods without attention.

SUMMARY OF THE INVENTION

A basic objective of the present invention is to fulfill this need. From this it will be apparent that the invention is intended to provide cell type apparatus for use in treating a fluid by electron emission which are efficient from an electrical standpoint in terms of the amount of fluid treatment or change accomplished per unit of electrical power consumed. The invention is also intended to provide equipment as indicated which may be utilized over a relatively prolonged period without breakdown. The invention is further intended to provide apparatus as indicated which is comparatively simple and easy to construct and/or to maintain, and which can be manufactured at a comparatively nominal cost.

In accordance with this invention these various objectives are achieved by providing an apparatus for use in treating a fluid by electron emission or corona discharge so as to cause a change in the fluid treated to produce a product, this apparatus having first and second electrodes which are spaced from one another, a dielectric means located between these electrodes and spaced from the first electrode so as to define a gap between the dielectric and the first electrode, sealing means surrounding the periphery of the gap and inlet and outlet means for use in circulating a fluid being treated through the gap between the electrodes at least one and preferably a combination of these individual features or facets as pointed out in this specification.

Preferably the sealing means employed are flexible in character so that the thickness of the gap in the apparatus can be varied. When such flexible sealing means are employed adjustment means should be provided for use in varying the thickness of this gap. Preferably the dielectric means as employed in an apparatus as described will consist of at least one layer of a first dielectric material including overlapping plate-like particles of an inert, inorganic dielectric composition and at least one layer of a second dielectric material which is different from the first dielectric material so as to minimize the possibility of flaws and/or imperfections in the dielectric materials being located adjacent to or "lined up with" one another.

There are a number of further features or facets which are preferably incorporated within and used in combination with one another in an apparatus as herein indicated. Preferably care is taken through the use of a dielectric composition or of different dielectric compositions so as to eliminate any voids between the second electrode and the dielectric material and between the layers of the dielectric. Further, preferably the thickness of the gap is carefully regulated as hereinafter indicated and preferably the exposed surfaces of the gap are covered or coated with an adherent coating of a material which promotes the discharge of a desired reaction product through the outlet. Preferably the periphery of the second electrode noted is recessed and a dielectric member is provided in the recess for the purpose of minimizing edge or corner type effects as the apparatus is operated.

BRIEF DESCRIPTION OF THE DRAWING

Because of the nature of the subject matter of this specification and because it is considered to be difficult to briefly summarize various facets and features as indicated in the preceding and others as hereinafter set forth it is considered desirable to further explain the invention with reference to the accompanying drawing in which:
The FIGURE is a diagrammatic cross-sectional view of a presently preferred embodiment or form of an apparatus for fluid treatment in accordance with this invention in which many parts have been deliberately distorted in size to facilitate an understanding of the invention.

Those skilled in the field of using electron emission so as to treat a fluid in order to cause a change resulting in the production of a product will realize that the various features and facets of an apparatus as illustrated may be utilized in many different ways in cells which are somewhat differently constructed and/or which differ from one another in appearance. Such individuals will further realize that various individual features and/or facets of the invention as claimed in the appended claims may be used separate from one another and on certain occasions this may be desirable, depending upon how a specific apparatus or cell is constructed and/or used. For this reason the invention set forth in this specification is to be considered as being limited only by the appended claims forming a part of this disclosure.

DETAILED DESCRIPTION

In the drawing there is shown a cell or apparatus 10 in accordance with this invention which is primarily intended to be utilized in connection with the production of ozone from either pure oxygen or an oxygen containing gas. It is to be understood that a plurality of these cell 10 may be utilized in series and/or parallel with one another in a particular installation.

This cell 10 is constructed so as to include a flat, rectilinear titanium plate 12 serving as a first electrode. For economic reasons it is preferred to locate this plate 12 flat against another correspondingly shaped aluminum plate 14 serving to reinforce the plate 12 and to conduct heat away from it. The side 16 of the plate 12 remote from the plate 14 is preferably covered with an adherent titanium dioxide coating 18. This coating 18 may be formed by the plate 12 being oxidized as the cell 10 is used or by separate oxidization of the plate 12.

This side 16 also rests against a somewhat resilient, somewhat elastomeric, somewhat flexible sealing washer 20. This sealing washer 20 is shaped so as to fit around the perimeter of the side 16 of the plate 12 as shown in order to seal off a gap or air gap 22 located between the coating 18 on the side 16 and a predominantly titanium dioxide layer or coating 24 located upon what may be loosely referred to as a dielectric structure of means 26.

If desired the coating 24 can be referred to as a part of the dielectric structure 26 since it is of a dielectric character although it is not employed because of its dielectric properties. This dielectric structure 26 preferably includes at least one layer 28 and preferably two or more layers 28 of a first dielectric material and at least one and preferably two or more layers 30 of a second dielectric material. The nature of this dielectric structure 26 is considered quite important in achieving preferred type or acceptable type results in accordance with this invention.

The layer 30 of the dielectric structure 26 furthest removed from the gap 22 and the plate 12 rests against another rectilinear plate 32 serving as a second electrode. This plate 32 corresponds in dimension with the plate 12 and is provided with a peripheral groove 34 which extends inwardly from around its periphery toward its center directly adjacent to the layer 30 in contact with the plate 32. This groove 34 holds a dielectric washer 36 which in a sense is not a part of the dielectric structure 26 but which can be regarded as part of this dielectric structure 26.

In obtaining effective results the layer or layers 28 used should utilize as a dielectric overlapping, flat, plate-like particles 38 of an inorganic dielectric composition which is inert with respect to any fluid present in the gap 22 during the operation of the cell 10, and which is substantially unaffected by the conditions of cell operation. Thus, in the cell 10 which is designed for use in the production of ozone these plate-like particles 38 should be dielectric particles which are inert to the effects of ozone and which will not deteriorate as the cell 10 is used. Because of their physical properties, their availability, and their ease of use it is preferred that these particles 38 be mica particles. It is believed, however, that flat, plate-like particles of other highly stable inorganic materials which are reasonably related in physical properties to mica can be employed. It is considered that there are a number of known silicate compositions which are of a plate-like character and which can be substituted for mica in a structure as described. It is not considered desirable to substitute for mica particles alumina particles and/or particles which from a practical standpoint are essentially alumina particles even though the alumina within them may be chemically combined with one or more other oxides since alumina is believed to tend to exhibit a tendency to breakdown under severe dielectric stress such as is normally contemplated within an apparatus such as the cell 10.

As employed these particles 38 overlap one another in more or less the manner in which scales on a fish overlap so as to tend to present a shield-like inorganic dielectric barrier which is also a barrier capable of resisting the penetration of ozone and/or any other reactive material present within the gap 22. In general no more particles 38 need be used in the layers 28 than are reasonably necessary to prevent or block any reaction between any material present within the gap 22 and the material within the layers 30. The use of more particles 38 than are necessary to accomplish this function is not considered detrimental since these particles 38 are effective dielectrics, even though they are utilized primarily to form a composite, overlapping physical barrier.

The particles 38 are preferably located in place and formed through the use of a commercial product known as "mica glass" produced by the General Electric Company of Schenectady, N.Y. A series of layers of this product are preferably used as the layers 28 so as to obtain a sufficient amount of the particles 38 in the dielectric structure 26 so that this dielectric structure 26 will be sufficiently resistant to and inert with respect to ozone and/or any other reactive material within the gap 22 to prevent dielectric degradation. Such "mica glass" is formed so that these sheets of it used to form a layer 28 include a dielectric glass cloth 40 backing or support for the particles 38 present on it. An appropriate dielectric polymer such as a conventional epoxy resin is preferably impregnated within the layers 28 so as to make them void free and so as to adhere the particles 38 in place.

The amount of such an organic binder present in each sheet comprising a layer 28 is so limited as to not tend to detract from the barrier like action achieved from the individual particles 38 present. If desired, of course, various other equivalent materials such as known inorganic binders in amounts no greater than reasonably necessary to hold the particles 38 together and in place during assembly and utilization of the cell 10 can be substituted for the glass cloth 40 and/or the polymer binder 42 indicated in this discussion.

The layer or layers 30 of the dielectric structure 26 are composed of a dielectric material which is different from the dielectric material in the layer or layers 28 employed so as to minimize the possibility of any flaws or imperfections, including those which may develop during the use of the cell 10 in the layer or layers 28 being located adjacent to and/or being lined up with any flaws or imperfections in the layer or layers 30 used. In general, the more of these layers 30 used the less the chance of individual flaws or imperfections including those that might develop in use in individual of these layers 30 being so aligned with flaws or imperfections in any other layer 30 and/or any layer 28.

The layer or layers 30 used are preferably composed of a material having relatively good dielectric characteristics which are dimensionally stable under the conditions of use and which are sufficiently flexible to release or accommodate heat caused stresses and/or strains which may arise as a result of the operation of the cell 10 without dielectric damage. Preferably the layer or layers 30 employed are of a material or composition which is as reasonably free from flaws or areas susceptible of developing flaws or imperfections which might cause dielectric breakdown as reasonably possible.

At the present time it is considered preferable to use as the individual layers 30 indicated films of "Mylar". It is well known that such films are composed of a linearly oriented polymer of terephthalic acid and ethylene glycol. It is believed that other closely related polymer films can be utilized. Various polyvinyl chloride and related films are not considered to be particularly satisfactory for use in a layer 30 because of their lack of dimensional stability. Heat as will normally be developed during the operation of the cell 10 will tend to soften such films. It is considered that it is simple to determine whether or not a material is suitable for use in a layer 30 through the use of routine experimentation to determine whether or not a cell 10 operates satisfactorily when a particular material is employed.

It is considered reasonably obvious why a material such as is employed in a layer 30 cannot be used in the cell 10 so as to be directly exposed to the gap 22. The highly reactive character of ozone or such other material as may be present within this gap 22 during the operation of the cell 10 would rapidly destroy and/or render inoperative a conventional polymer dielectric material. It is considered necessary to use such material in the cell 10, however, because of the fact that heat caused stresses and strains as noted in the preceding will be accommodated by a polymer material as noted without the performance of the cell 10 being affected. The material within a layer or the layers 30 is considered to support the individual particles 38 in such a manner that these particles 38 are held essentially as a physical barrier so as to more or less "float" on the material within the layer or layers 30 in such a manner that heat caused stresses and strains will accommodate limited movement of the particles 38 without significant interference with the barrier like operation of these particles 38. The latter results from their being adjacent to one another and overlapping one another.

Because of the conditions which prevail within the cell 10 as it is operated it is necessary to form the dielectric structure 26 in such a manner that this entire dielectric structure 26 is in effect void free and to locate this dielectric structure 26 in place so that there are no voids between the plate 32 and the layer 30 adjacent to this plate 32. Any voids within these areas have the potential of being sites where reactions detrimentally affecting dielectric life or performance could occur during the operation of the cell 10. Thus, for example, if there were even minute quantities of air present adjacent to a layer 30 as the cell 10 is operated some ozone would be formed in this air and such ozone would detrimentally attack the adjacent polymer material so as to tend to cause flaws or imperfections.

It is considered that voids as noted can be eliminated in various different ways which are reasonably well known. In accordance with this invention it is preferred to eliminate voids from between the layers 28 and 30 and from between the plate 32 and the adjacent layer 30 by using comparatively thin, void free films 44 of a dielectric material which will "wet" adjacent surfaces as applied. As subsequently indicated preferably the material used will "harden" so as to act as an adhesive so as to bond the individual parts together as a unit. The films 44 should be as thin as reasonably possible so as to avoid their acting as the layers 28 and 30 in the dielectric structure 26.

The material used in any such film 44 must be of a dielectric character so as to avoid the possibility of undesired consequences during the operation of the cell 10. Further such a film should be of a material which is of a fluid or viscous like character at at least the time of such assembly. To avoid the possible effect on the operating characteristics of the cell 10 the material within the film 44 must, like the material within the layers 28 and 30, be of such a character as to be reasonably stable dimensionally as the cell 10 is operated, and as its use begins and is discontinued.

The requirements noted in the preceding for a material to be used in a film 44 automatically eliminate the use of many common materials which would normally be utilized in this type of application. As an example of this if a conventional grease was used to form a film 44 such a grease would tend to soften and flow under the conditions arising from the use of the cell 10 and this in turn would tend to affect the uniformity of the dielectric structure 26. Some fluids such as certain glues which might be considered acceptable for use in forming a film such as the film 44 are unacceptable because of the tendency of such fluids to decompose as the cell 10 is used.

Because of these considerations it is presently preferred to assemble the dielectric structure 26 using films 44 other than between the plate 32 and the adjacent layer 30 of a known epoxy resin dielectric adhesive which will be of a viscous, fluid-like character during assembly and which will thereafter harden so as to form a comparatively rigid bond. When the material within a film 44 is so hardened it will not tend to soften or flow to any significant extent during the use of the cell 10 and will also tend to hold the parts described in contact with respect to one another so as to form a unitary structure.

The film 44 between the plate 32 and the adjacent layer 30 is preferably of a relatively weak adhesive character so as to facilitate replacement of the dielectric structure 26 in the cell 10 if for any reason this should become necessary. A conventional non-water based acrylic glue can be used in forming this particular film 44. A suitable adhesive is sold by the 3M Company of St. Paul, Minn. under the trademark "SCOTCHGRIP".

In general the thinner the films 44 are the better as far as ultimate results are concerned since normally such films will be composed of a material which is not as desirable as a dielectric as the material within the layer or layers 30 and since normally a material within a film 44 will not possess the physical properties possessed by the material in the layer or layers 30.

It is also possible to utilize a film 44 as described in the preceding in connection with the location and mounting of the dielectric washer 36 in the groove 34 in the plate 32. In the drawing such films 44 are shown between the washer 36 and the adjacent layer 30 and between the junction between the washer 36 and the plate 32 leading away from a layer 30 while a separate film 46 is illustrated between the washer 36 and the plate 32 along the surface (not separately numbered) of the washer 36 remote from the layer 30. This film 46 is separately designated so as to indicate that the absence of voids generally beneath the washer 36 is not considered to be as critical as the absence of voids in other locations. Nevertheless it is considered that the entire structure should be substantially void free.

The cell 10 also includes several additional parts which are essentially of a conventional character. Appropriate electric terminals 48 of a conventional character are connected to the plates 14 and 32. The terminal 48 connected to the plate 14 is used so that the power supplied to this plate 14 will be distributed by it reasonably uniformly to the plate 12. Since these terminals 48 are of a conventional character they are only diagrammatically indicated in the drawing. Further, the cell 10 includes aligned inlet holes 50 and aligned outlet holes 52, both of which are formed in the plates 12 and 14. Appropriate conventional pipes or conduits 54 are threaded into these holes 50 and 52 so that a fluid may be circulated through the gap 22 in a conventional manner as the cell 10 is operated.

In order to complete this cell 10 as an operative unit it is necessary to include as a part of it what may be loosely referred to as "adjustable securing means" holding the various parts previously described in an operative relationship to one another as illustrated in the drawing. In the precise structure of the cell 10 illustrated such means takes the form of common bolts 56 extending between base flanges 58 on T-shaped structural members 60. These members 60 are located relative to one another so that these base flanges 58 bear against electrically nonconductive plates or sheets 62 in order to prevent deformation of plates 14 and 32 as the cell 10 is operated. The entire cell 10 is, of course, electrically isolated in a conventional manner.

These members 60 also include central flanges 64 which extend outwardly at a right angle to the base flanges 58 and to the plates 14 and 32 in order to add structural rigidity tending to oppose any outward deformation of operative parts of the cell 10. The internal pressure of a fluid within the gap 22 as the cell 10 is operated may at times be sufficient to tend to cause such deformation. Further, such deformation may also be caused as a result of heat accumulation in turn resulting from the operation of the cell 10.

With the structure shown the flanges 58 are located so they will conduct heat from the plates 12 and 32 to the central flanges 64. These members 60 will tend to act to a degree as cooling fins, facilitating heat dissipation to the ambient air. Such heat dissipation may of course be encouraged in other known manners such as by controlling the air flow around the cell 10. The precise number of members 60 required with a particular cell 10 will vary in accordance with the details of the construction of this cell 10 and the manner in which this cell is to be operated. It is considered that sufficient of the members 60 should be used so that there are substantially no measurable effects from temperature caused expansion of the cell 10 as it is employed.

Although the aforegoing indicates the operative parts of the cell 10 it does not indicate the reasons for certain of these parts and/or indicate the manner in which certain of these parts are related to the operation of the cell 10. As an example of this the coating 18 and the layer 24 of titanium dioxide are present within the cell 10 primarily to promote the efficiency of the cell 10 as an ozonizer by increasing the output of ozone produced as this cell 10 is operated per unit of power consumed. This coating 18 and this layer 24 are desirable because titanium dioxide is considered to act as a catalyst to promote the formation of ozone from normal oxygen. At present, however, it is questioned whether or not titanium dioxide does in fact act as a catalyst for the production of ozone or whether it acts as a sort of reverse catalyst tending to suppress the decomposition of ozone into normal atmospheric oxygen.

Because of the fact that the plate 12 is a titanium plate the coating 18 described will normally be formed upon this plate 12 automatically as the cell 10 is initially operated to produce ozone. Preferably this coating 18 is formed by separately oxidizing the plate 12 in a known manner. The layer 24 can be formed by applying a thin paint-like film of titanium dioxide particles and a conventional dielectric binder to adhere these particles in place. In general no more binder should be used than resonable necessary.

The exact character of the binder composition used is considered to be relatively unimportant. Coatings corresponding to the layer 24 have been created utilizing a mixture of one part by volume commercial acrylic non-glossy white paint designed for household use containing an unknown amount of titanium dioxide pigment, one part of volume of commercial acrylic white glue. Such a mixture has been applied to a surface of a layer 28 as a coating of a thickness corresponding to the thickness of a common coat of paint, and then has been dusted with titanium dioxide powder until no further powder would adhere to the coating.

The aforegoing does not, however, completely indicate the nature of the layer 24 as the cell 10 is operated. The highly reactive character of ozone as produced within this cell 10 will of course attack a polymer such as an acrylic polymer and further such a polymer will be subject to considerable dielectric stress tending to cause polymer breakdown. It is believed that as a cell such as the cell 10 is operated that the effects of such ozone and of such dielectric stress tend to alter the form of not only the polymer material within the layer 24 but in addition the polymer material within the layer or layers 28 to an extent which will vary so as to rapidly decrease in accordance with the distance from the gap 22.

The precise effect and/or effects on the noted polymer material or materials resulting from the use of the cell 10 are not precisely known or understood. It is believed, however, that the effects noted tend to strip hydrogen from the chains in these polymers so as to produce polymer degradation products which act as a binder for the titanium dioxide in the layer 24 and for the particles 38 so as to hold them in place as the cell 10 is operated.

The washer 36 is used in this cell 10 so as to tend to control so-called edge effects which might tend to concentrate the dielectric stresses adjacent to the edges of the plates 12 and 32 as the cell 10 is operated. It is considered critical for prolonged performance of the cell 10 and more specifically of the dielectric structure 26 that the dielectric stresses exerted across the dielectric structure 26 be reasonably uniform at all points extending through the dielectric structure 26.

If such uniformity was not achieved there would be a significant danger of dielectric failure at any point of dielectric stress concentration. The washer 36 is considered to facilitate the achievement of such reasonable or substantial uniformity of dielectric stress. Such uniformity is of course also achieved by forming the dielectric structure 26 and the layer 24 so that they are of uniform characteristics and thickness at all points or locations perpendicular to the plates 12 and 32.

One facet of the cell 10 which is considered to be quite critical as far as the production of ozone is concerned relates to the thickness of the gap 22 employed. Since the particular cell 10 illustrated is intended to be utilized in the production of ozone it is presently believed that the thickness of this gap 22 should be from about 0.010 to about 0.029 inches (0.025 cm. to 0.050 cm.) in thickness in order to maximize ozone production per unit of power consumed. These specific dimensions have been developed on the basis of the combination of empirical observation and of theoretical considerations.

Although it is not normally considered to be an explosive, ozone is in fact under certain conditions capable of exploding as it breaks down into the normal oxygen molecule. The explosion distance for the ozone molecule is commonly referred to as the minimum diameter of an opening which will propagate an explosion. It is presently considered that the explosion distance for ozone at 20° C. is about 0.003 inches (0.008 cm.). Obviously the decomposition of ozone in a cell 10 would be suppressed if the gap 22 were of a thickness corresponding to this explosion distance.

However, there are factors relative to the operation of a cell such as the cell 10 which makes the use of such a thin gap 22 impractical. These factors pertain to the problem of getting adequate flow of either pure oxygen or an oxygen containing gas through the gap 22 at a reasonable cost. Probably the effects of fluid friction are also involved in the complex reactions which take place within the gap 22.

It is considered well known that these complex reactions in a cell for producing ozone probably involve the formation of an $O_6$ molecule, the constant breakdown and recombination of $O_2$, $O_3$, and $O_6$ molecules and the like. Hence, it is considered desirable to make the gap 22 of such a thickness as to reach a balance between the thinness of this gap tending to minimize undesired breakdown of ozone and this gap being so thin as to present an undesired handicap to fluid flow. At the present time it is considered that a gap thickness as specified represents such a balance which is economically favorable to the production of ozone.

It is considered it would be obvious that the thickness of the gap 22 will normally be within a different range of values with a cell such as the cell 10 constructed so as to be utilized in treating another fluid than oxygen or an oxygen containing gas mixture. It is believed that a suitable thickness of the gap 22 for any specific application other than the application noted can be determined on essentially ann empirical basis in connection with any specific use of such a cell.

As a guide to aid in the minimization of such an experimentation it is presently believed that the thickness of the gap 22 for any specific application should be roughly 12 times the explosion distance at 20° C. and at operating pressure of any unstable product produced in the cell. For applications other than the formation of ozone a cell such as the cell 10 should normally be altered so as to either dispense with the coating 18 and the layer 24 and/or to substitute equivalents.

The specific dimensions of the cell corresponding to the cell 10 should also be otherwise related to the intended operation of such a cell if a maximum efficiency of fluid treatment by electron emission is to be achieved. A factor involved in the design of a specific cell such as the cell 10 will also be the so-called "dwell time", i.e., the time period during which a fluid being treated is within a gap 22. This is related to the pressure of the fluid as it passes through this gap 22. In general, the higher the pressure of the fluid within the gap 22 the higher the voltages required in operating the cell 10 to obtain the desired reactions within this cell, and this in turn will be related to the dielectric requirements of the cell 10.

Another related factor is the consideration that generally the efficiency of a particular cell from an electrical standpoint will tend to fall off or decrease as the concentration of a desired product or products produced as a result of treatment within the cell 10 increases. A further consideration is the fact that volumetric changes will normally occur in the fluid passing through a cell such as the cell 10 as a result of the reactions transpiring within the cell. Another matter which will normally affect a decision as to precisely how to construct a cell such as the cell 10 will be the purely practical limitation of how large a piece of equipment should be for commercial reasons.

The performance of a cell such as the cell 10 will to a degree be influenced by factors such as the specific nature and location of the inlet and the outlet to the gap 22 and whether or not the gap 22 contains a barrier or baffle (not shown) in order to control the flow within the gap 22. Because of all these factors it is not considered practical or meaningful to specify the precise dimensions in terms of length and width of a gap such as the gap 22 described.

One advantage possessed by cells such as the cell 10 relates to the use of the bolts 56 in connection with the sealing washer 20. The precise construction described enables this sealing washer 20 to be compressed and/or expanded by varying the pressure exerted through the bolts 56 in order to vary the precise thickness of the gap 22 in any manner which maybe reasonably desired in order to maximize the output of a product such as ozone. With the structure shown the gap 22 may be tapered slightly so as to accommodate either a volumetric increase in volume within the cell 10 and/or a volumetric decrease of the fluid treated within this cell through appropriate adjustment of the bolts 56.

In connection with the production of ozone it is presently considered that it will on occasion be desirable to taper the gap 22 so that this gap is of a minimum dimension adjacent to the outlet 52 in order to accommodate the volumetric changes resulting from the production of $O_3$ and in order to utilize pressure effects in minimizing the decomposition of ozone even though the efficiency of the production of ozone will tend to fall off slightly as the concentration of ozone in the gas being treated increases. The ability to adjust the thickness of the gap 22 is also considered to be quite important in connection with the cell 10 for another reason.

The electrical characteristics of this cell 10 must be related to the electrical characteristics of the circuit utilized to power the cell 10 if relatively high electrical efficiency is to be achieved. With the structure of the cell 10 described the relative spacing between the plates 12 and 32 may be varied to some extent so as to enable the capacitance of the cell 10 to be "tuned" or adjusted to a desired value related to the electrical characteristics of the power supply circuit. This is considered to be important.

Those skilled in the art of fluid treatment by electron emission will realize that cells such as the cell 10 can be constructed and utilized in a number of different ways. They will further realize that many aspects of the cell 10 can be utilized with different cells or apparatus for fluid treatment by electron emission of already known design so as to improve the performance of such known cells. It is considered, however, that the various factors and/or features of a novel character embodied within the specific cell 10 are of such a related nature that maximum benefits as far as high electrical efficiency and prolonged performance are concerned are only achieved when all of these features are used together in one apparatus or cell of the typed described.

We claim:

1. An apparatus for use in treating a fluid by corona discharge so as to produce a product, said apparatus having first and second electrodes which are spaced from one another, a dielectric means located between said electrodes and spaced from said first electrode so as to define a gap between said dielectric means and said first electrode, sealing means surrounding the periphery of said gap and inlet and outlet means for use in circulating a fluid through said gap between said electrodes in which the improvement comprises:

said dielectric means consisting of at least one layer of a first dielectric material exposed to said gap and at least one layer of a second dielectric material located between said first dielectric material and said second electrode, said layers and said dielectric means fitting closely against one another and against said second electrode so that there are no voids between said layers and between said dielectric means and said second electrode, said first dielectric material including overlapping, flat, plate-like particles of an inert, inorganic dielectric composition, said second dielectric material being different from said first dielectric material so as to minimize the possibility of flaws in said first and second dielectric materials being located adjacent to one another.

2. An apparatus as claimed in claim 1 wherein:
said second dielectric material comprises at least one layer of a polymer film which is substantially free from internal imperfections.

3. An apparatus as claimed in claim 1 wherein:
said layer of said first dielectric material comprises a sheet of fiberglass cloth adhered to and supporting a plurality of said particles.

4. An apparatus as claimed in claim 1 wherein:
there are a plurality of layers of said first dielectric material, each of said layers comprising a sheet of fiberglass cloth adhered to and supporting a plurality of said particles, there are a plurality of layers of said second dielectric material, each of said layers of said second dielectric material comprising a sheet of a polymer film which is substantially free from internal imperfections.

5. An apparatus as claimed in claim 4 wherein:
said particles are mica particles and
said polymer film is an oriented film of a linear condensation polymer of terephthalic acid and ethylene glycol.

6. An apparatus as claimed in claim 5 wherein:

there are no voids between said layers of said dielectric material and between said dielectric means and said second electrode.

7. An apparatus as claimed in claim 6 wherein:
the surfaces of said first electrode and of said dielectric means exposed to said gap are both covered with an adherent coating of titanium dioxide.

8. An apparatus as claimed in claim 7 wherein:
said sealing means in capable of expanding and contacting and including
adjusting means for adjusting the relative positions of said first and said second electrodes while said sealing means maintains a seal surrounding the periphery of said gap.

9. An apparatus as claimed in claim 8 wherein:
said sealing means comprises a resilient washer which is substantially inert to any fluid which will contact said washer during the use of said apparatus.

10. A single cell for use in treating a fluid by corona discharge, said cell having first and second electrodes which are spaced from one another, and no other electrodes than said first and second electrodes, a dielectric means located between said electrodes and spaced from said first electrode so as to define a gap between said dielectric means and said first electrode, sealing means surrounding the periphery of said gap, an inlet and outlet means for use in circulating a fluid through said gap between said electrodes in which the improvement comprises:
said sealing means being capable of expanding and contacting so as to permit a variation in the thickness of said gap between said first electrode and said dielectric means,
adjustment means for use in adjusting the relative positions of said first and said second electrodes so as to vary said thickness of said gap and so as to vary the spacing between said electrodes while said sealing means maintains a seal surrounding the periphery of said gap,
said dielectric means comprises a multilayer dielectric structure, the layers of said structure extending parallel to said gap,
the layer of said structure closest adjacent to said gap consisting of a series of flat, plate-like particles of an inert, inorganic dielectric composition located in an overlapping relationship with respect to one another so as to define a barrier capable of deformation where said particles overlap one another,
at least one other layer of said dielectric structure including a film of a dimensionally stable dielectric polymer means which is capable of limited movement so as to accommodate temperature caused stresses and strains therein.

11. An apparatus as claimed in claim 10 wherein:
said sealing means comprises a flexible, resilient inert gasket located between said first electrode and said dielectric means.

12. An apparatus as claimed in claim 10 including:
reinforcing structural member means located on the sides of said first and said second electrodes remote from one another and extending across said electrodes, and wherein
said adjustment means comprises fastener means connecting the extremities of said structural member means on opposite sides of said electrodes.

13. An apparatus as claimed in claim 12 wherein:
said sealing means comprises a flexible, resilient gasket which is substantially inert during the use of said apparatus located between said first electrode and said dielectric means.

14. An apparatus as claimed in claim 10 wherein:
said second electrode includes a groove formed around the perimeter therein and
said dielectric means, includes a dielectric washer located in said groove and in contact with at least one other layer of said dielectric structure.

15. An apparatus as claimed in claim 10 including:
a dielectric catalyst coating located on said layer of said particles exposed to said gap.

16. An apparatus as claimed in claim 10 including:
an adherent coating of titanium dioxide located upon the surface of said first electrode exposed to said gap and another coating of titanium dioxide located upon said layer of said particles so as to be exposed to said gap.

17. An apparatus as claimed in claim 10 wherein:
said dielectric structure is void-free and the layers thereof are adhesively bonded to one another and
there are no voids between said dielectric structure and said second electrode.

18. An apparatus as claimed in claim 10 wherein:
said dielectric means comprises a multi-layer dielectric structure, the layers of said structure extending parallel to said gap,
the layer of said structure closest adjacent to said gap consisting of a series of flat, plate-like particles of an inert, inorganic dielectric composition located in an overlapping relationship with respect to one another so as to define a barrier capable of deformation where said particles overlap one another,
at least one other layer of said dielectric structure including a film of a dimensionally stable dielectric polymer means and which is capable of limited movement so as to accommodate temperature caused stresses and strains therein,
said dielectric structure is void-free and the layers thereof are adhesively bonded to one another and
there are no voids between said dielectric structure and said second electrode,
an adherent coating of titanium dioxide located upon the surface of said first electrode exposed to said gap and another coating of titanium dioxide located upon said layer of said particles so as to be exposed to said gap,
said sealing means comprises a flexible, resilient inert gasket located between said first electrode and said dielectric means,
reinforcing structural member means located on the sides of said first and said second electrodes remote from one another and extending across said electrodes, and wherein
said adjustment means comprise fastener means connecting the extremities of said structural member means on opposite sides of said electrodes.

19. An apparatus as claimed in claim 18 wherein:
said second electrode includes a groove formed around the perimeter therein and
said dielectric means includes a dielectric washer located in said groove and in contact with at least one other layer of said dielectric structure.

20. A fluid treatment cell for use in treating a fluid by corona discharge which comprises:
a first electrode,
a dielectric structure located adjacent to and spaced from said first electrode so as to define a gap between said first electrode and said dielectric structure, sealing means for forming a seal so as to close off said gap located between said dielectric structure and said first electrode, a second electrode located adjacent to said dielectric structure on the side thereof remote from said first electrode, said dielectric structure including at least one barrier layer of inert, inorganic particles located adjacent to said gap and at least one layer of a different dielectric material located between said barrier layer and said second electrode, said dielectric structure being substantially void free, having a uniform thickness between said electrodes and having uniform dielectric properties across said thickness, terminal means for supplying electric power to said electrode, an inlet means leading into said gap for introducing a fluid into said gap, an outlet means leading from said gap located so as to be spaced from said inlet means, said outlet means being for removing a fluid from within said gap, securing means for holding said electrodes and said sealing means and said dielectric structure together as herein defined.

* * * * *